(12) United States Patent
Minamikawa et al.

(10) Patent No.: US 12,159,066 B2
(45) Date of Patent: Dec. 3, 2024

(54) CONTROLLER CONFIGURED TO STORE TRANSMISSION ADDRESS INFORMATION TO WHICH PAYMENT PROCESS INFORMATION FOR PRINT JOB IS TRANSMITTED IN ASSOCIATION WITH IDENTIFICATION INFORMATION

(71) Applicant: BROTHER KOGYO KABUSHIKI KAISHA, Nagoya (JP)

(72) Inventors: Shunsuke Minamikawa, Nagoya (JP); Tetsuya Okuno, Nagoya (JP); Haruka Azechi, Nagoya (JP); Ayaka Hotta, Kitanagoya (JP); Yushi Deura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/936,902

(22) Filed: Sep. 30, 2022

(65) Prior Publication Data
US 2023/0025765 A1 Jan. 26, 2023

Related U.S. Application Data

(63) Continuation of application No. PCT/JP2021/011395, filed on Mar. 19, 2021.

(30) Foreign Application Priority Data

Mar. 31, 2020 (JP) ................ 2020-063735

(51) Int. Cl.
*G06F 3/12* (2006.01)
*G03G 15/00* (2006.01)

(52) U.S. Cl.
CPC ....... *G06F 3/1205* (2013.01); *G03G 15/5091* (2013.01); *G06F 3/1237* (2013.01); *G06F 3/1285* (2013.01)

(58) Field of Classification Search
CPC .... G06F 3/1205; G06F 3/1237; G06F 3/1285; G06F 3/12; G06F 13/00; G03G 15/5091; B41J 29/38; H04N 1/00; H04N 1/34
See application file for complete search history.

(56) References Cited

U.S. PATENT DOCUMENTS 11,609,721 B2 * 3/2023 Ueno ................ G06F 3/0482
2009/0066985 A1 * 3/2009 Ferlitsch ............ G06Q 10/107
455/406

(Continued)

FOREIGN PATENT DOCUMENTS

JP 2001258008 A 9/2001
JP 2002199118 A 7/2002

(Continued)

OTHER PUBLICATIONS

International Search Report dated Jun. 8, 2021 issued in PCT/JP2021/011395.

(Continued)

*Primary Examiner* — Helen Zong
(74) *Attorney, Agent, or Firm* — Scully, Scott, Murphy & Presser, PC (57) ABSTRACT

A printing device includes a controller configured to perform: (a) storing identification information and transmission address information in association with each other; (b) acquiring, in response to receiving a print job together with the identification information from an external device, the transmission address information stored in association with the identification information in the (a) storing on the basis of the received identification information; and (c) transmitting the transmission address information acquired in the (b) acquiring to a data processing server so that payment process information is transmitted to a transmission address corresponding to the transmission address information, the (Continued)

payment process information being information to pay a fee charged for performing printing based on the received print job.

12 Claims, 4 Drawing Sheets

(56) References Cited

U.S. PATENT DOCUMENTS

| | | | |
|---|---|---|---|
| 2009/0089192 A1* | 4/2009 | Ferlitsch | G06Q 40/128 |
| | | | 705/30 |
| 2013/0250330 A1* | 9/2013 | Chigusa | H04N 1/00973 |
| | | | 358/1.14 |
| 2018/0213115 A1* | 7/2018 | Sun | G06F 3/129 |
| 2022/0035586 A1* | 2/2022 | Lee | G06F 3/121 |

FOREIGN PATENT DOCUMENTS

| | | |
|---|---|---|
| JP | 2010204928 A | 9/2010 |
| JP | 2018013952 A | 1/2018 |
| JP | 2018118406 A | 8/2018 |

OTHER PUBLICATIONS

International Preliminary Report on Patentability, Written Opinion and translation dated Sep. 29, 2022 issued in PCT/JP2021/011395.

* cited by examiner

CONTROLLER CONFIGURED TO STORE TRANSMISSION ADDRESS INFORMATION TO WHICH PAYMENT PROCESS INFORMATION FOR PRINT JOB IS TRANSMITTED IN ASSOCIATION WITH IDENTIFICATION INFORMATION

REFERENCE TO RELATED APPLICATIONS

This is a by-pass continuation application of International Application No. PCT/JP2021/011395 filed Mar. 19, 2021 claiming priority from Japanese Patent Application No. 2020-063735 filed on Mar. 31, 2020. The entire content of the priority application is incorporated herein by reference.

BACKGROUND ART

A prior art describes a conventional document printing system for printing an image based on print data. In this printing system, when an external electronic device transmits print data to an MFP, the MFP transfers the print data to a computer so that the computer calculates a fee required for printing. The computer then transmits a two-dimensional code for the calculated fee to the MFP, and the MFP displays the two-dimensional code on a display unit.

DESCRIPTION

However, when a user wishes to pay the calculated fee in order to print an image based on print data in the conventional document printing system described above, the user has to go to a location at which the MFP is installed and to read the two-dimensional code displayed on the display unit of the MFP using a terminal device of the user. Thus, the conventional document printing system is not convenient to use.

In view of the foregoing, it is an object of the present disclosure to provide a printer, a printing system, a storage medium storing set of computer-readable instructions, and a printing method that can improve usability by enabling a user to perform operations on an external device for paying a fee required to execute a print job transmitted from the external device.

In order to attain the above and other object, the present disclosure provides a printing device including: a controller configured to perform: (a) storing identification information and transmission address information in association with each other; (b) acquiring, in response to receiving a print job together with the identification information from an external device, the transmission address information stored in association with the identification information in the (a) storing on the basis of the received identification information; and (c) transmitting the transmission address information acquired in the (b) acquiring to a data processing server so that payment process information is transmitted to a transmission address corresponding to the transmission address information, the payment process information being information to pay a fee charged for performing printing based on the received print job.

In the above structure, since the controller transmits the transmission address information stored in advance to the data processing server, the data processing server can transmit the payment process information to the transmission address on the external device. Accordingly, the user can perform operations on the external device to proceed with the payment process on the basis of the payment process information, thereby improving usability.

According to another aspect, the present disclosure also provides a printing system including a printing engine. The printing system is configured to perform: (a) storing identification information and transmission address information in association with each other; (b) acquiring, in response to receiving a print job together with the identification information from an external device, the transmission address information stored in association with the identification information in the (a) storing on the basis of the received identification information; (c) determining a fee to be charged for performing printing based on the received print job; (d) transmitting payment process information to a transmission address corresponding to the transmission address information, the payment process information being information to pay the fee determined in the (c) determining; and (e) controlling the printing engine to perform printing based on the received print job.

According to still another aspect, the present disclosure also provides a non-transitory computer-readable storage medium storing a set of program instructions for a printing device including a processor. The set of program instructions, when executed by the processor, causes the printing device to perform: (a) storing identification information and transmission address information in association with each other; (b) acquiring, in response to receiving a print job together with the identification information from an external device, the transmission address information stored in association with the identification information in the (a) storing on the basis of the received identification information; and (c) transmitting the transmission address information acquired in the (b) acquiring to a data processing server so that payment process information is transmitted to a transmission address corresponding to the transmission address information, the payment process information being information to pay a fee charged for performing printing based on the received print job.

According to still another aspect, the present disclosure also provides a method for a printing system. The method includes: (a) storing identification information and transmission address information in association with each other; (b) acquiring, in response to receiving a print job together with the identification information from an external device, the transmission address information stored in association with the identification information in the (a) storing on the basis of the received identification information; (c) determining a fee to be charged for performing printing based on the received print job; (d) transmitting payment process information to a transmission address corresponding to the transmission address information, the payment process information being information to pay the fee determined in the (c) determining; and (e) performing printing based on the received print job.

Figure 1:
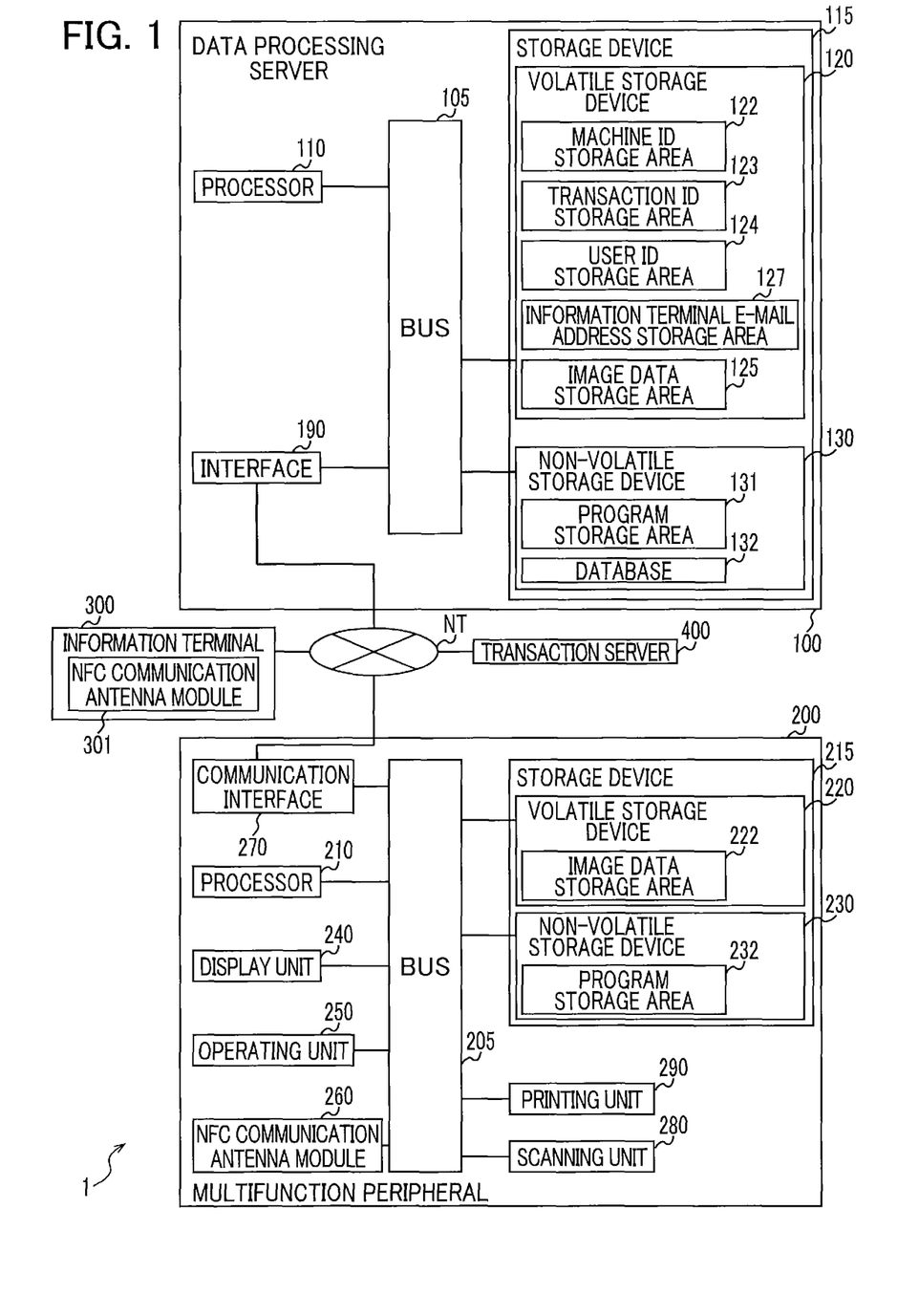
FIG. 1 is a block diagram illustrating an overall outlined configuration of a printing system.

FIG. 1 illustrates a printing system 1 according to one embodiment of the present disclosure. In the present embodiment, the printing system 1 provides a printing service in which users, i.e., customers can use the printing function of a multifunction peripheral 200 by paying a fee.

<Outline of Printing System>

The printing system 1 illustrated in FIG. 1 includes a data processing server 100, the multifunction peripheral 200, an information terminal 300, and a transaction server 400. The data processing server 100, the multifunction peripheral 200, the information terminal 300, and the transaction server 400 are interconnected over a network NT to communicate with each other. The information terminal 300 is an example of the external device.

<Information Terminal>

The information terminal 300 in this example is a mobile terminal such as a smartphone or a tablet computer possessed by the user. The information terminal 300 is connected to the network NT through wireless communication. Although not illustrated in the drawings, the information terminal 300 includes a processor, a storage device, and an interface for connecting to the network NT.

The information terminal 300 also includes an NFC communication antenna module 301. The NFC communication antenna module 301 is an interface that uses a near-field wireless protocol to conduct wireless communication for exchanging wireless signals with the multifunction peripheral 200. An IC chip having a memory for storing therein information to be exchanged with the multifunction peripheral 200 is mounted on the NFC communication antenna module 301 to enable the information terminal 300 to perform wireless communication in accordance with NFC standards through the NFC communication antenna module 301. Here, wireless communication through the NFC communication antenna module 301 (hereinafter referred to as "NFC communication") has a communication range shorter than that of wireless communication according to a Wi-Fi protocol, for example. The information terminal 300 can exchange information with the multifunction peripheral 200 through NFC communication using the NFC communication antenna module 301.

<Data Processing Server>

The data processing server 100 is installed and managed by the manufacturer of the multifunction peripheral 200, for example. The data processing server 100 includes a processor 110, a storage device 115, and an interface 190. The processor 110, the storage device 115, and the interface 190 are interconnected via a bus 105.

The storage device 115 includes a volatile storage device 120, and a non-volatile storage device 130. The volatile storage device 120 is a DRAM, for example, and has a machine ID storage area 122, a transaction ID storage area 123, a user ID storage area 124, an image data storage area 125, and an information terminal e-mail address storage area 127. The non-volatile storage device 130 is a hard disk drive or a solid state drive, for example. The non-volatile storage device 130 has a program storage area 131, and a database 132. The contents stored in these storage devices will be described later in detail.

The processor 110 is a device that performs data processing, such as a CPU. By executing a program stored in the program storage area 131, the processor 110 executes various processes, such as those illustrated in FIGS. 2, 4, and the like described later, including processes for performing data communications with the information terminal 300, the multifunction peripheral 200, and the transaction server 400 connected to the network NT.

The interface 190 is a wired LAN interface or a wireless interface for communicating with other devices. The interface 190 is connected to the network NT.

<Transaction Server>

The transaction server 400 is installed at a company providing various online services for settling online payments, for example. Although not illustrated in the drawings, the transaction server 400 includes a processor, a storage device, and an interface for connecting to the network NT.

<Multifunction Peripheral>

The multifunction peripheral 200 is owned by a company providing the printing service described above, for example. The multifunction peripheral 200 includes a scanning unit 280, a printing unit 290, a processor 210, a storage device 215, a display unit 240, a user-operable operating unit 250, an NFC communication antenna module 260, and a communication interface 270. The scanning unit 280, the printing unit 290, the processor 210, the storage device 215, the display unit 240, the operating unit 250, the NFC communication antenna module 260, and the communication interface 270 are interconnected via a bus 205. The multifunction peripheral 200 is an example of the printing device.

As with the NFC communication antenna module 301 in the information terminal 300, the NFC communication antenna module 260 is an interface that uses a near-field wireless protocol for conducting wireless communication. The NFC communication antenna module 260 can exchange wireless signals with the NFC communication antenna module 301. An IC chip having a memory for storing therein information to be exchanged with the information terminal 300 is mounted on the NFC communication antenna module 260. The NFC communication antenna module 260 performs wireless communication in accordance with the NFC standards. The NFC communication antenna module 260 is an example of the communication interface.

While the multifunction peripheral 200 is powered on, the multifunction peripheral 200 can detect devices capable of performing wireless communication in accordance with the NFC standards by emitting signals from the NFC communication antenna module 260. Therefore, wireless communication in accordance with the NFC standards is automatically enabled between the information terminal 300 and the multifunction peripheral 200 when the user brings the information terminal 300 near the NFC communication antenna module 260. Note that the phrases "brings (places) the information terminal 300 near the NFC communication antenna module 260" implies an operation for bringing the information terminal 300 within the communication range of the NFC communication antenna module 260, whereby the information terminal 300 may or may not be in contact with the NFC communication antenna module 260.

The storage device 215 includes a volatile storage device 220, and a non-volatile storage device 230. The volatile storage device 220 is a DRAM, for example. The volatile storage device 220 has an image data storage area 222 for storing therein image data. The non-volatile storage device 230 is a flash memory, for example. The non-volatile storage device 230 has a program storage area 232 for storing therein various programs. Of programs stored in the program storage area 232, print procedure programs according to the present embodiment for executing the processes in FIGS. 2, 4 and the like are stored in advance as firmware, for example. The storage device 215 is an example of the storage device.

The processor 210 is a device such as a CPU that performs data processing. By executing a program stored in the program storage area 232, the processor 210 executes a print control in cooperation with the processor 110 of the data processing server 100 for controlling the printing unit 290 in order to print images based on image data transmitted from the information terminal 300. The processor 210 is an example of the controller.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT.

The scanning unit 280 is configured to optically read a document or other scanning target using photoelectric conversion elements such as a CCD or a CMOS, and to generate image data representing an image of the scanning target.

The printing unit 290 is configured to print images according to a prescribed method on paper picked up from a feed tray and conveyed using a conveying mechanism (not illustrated). The following specification describes a case in which the printing unit 290 performs printing according to an inkjet method. The printing unit 290 is an example of the printing engine.

Features of the Embodiment

The features of the present embodiment are processes for enabling payment of a fee required to print images in a print job transmitted from the information terminal 300 to be performed on the information terminal 300. Hereinafter, detailed description as to the features will be made below in sequence.

<Process Flow>

The control processes executed by the processor 210 of the multifunction peripheral 200, the processor 110 of the data processing server 100, the processor of the transaction server 400, and the processor of the information terminal 300 will be described while referring to FIGS. 2 and 4. Note that, in the following description as to the control processes (illustrated in FIGS. 2, 4, and the like), references relating to "the processors" will be omitted. As an example, the phrases such as "the processor 210 of the multifunction peripheral 200" or "by the processor 210 of the multifunction peripheral 200" will be simply referred to as "the multifunction peripheral 200" or "by the multifunction peripheral 200", respectively.

Figure 2:
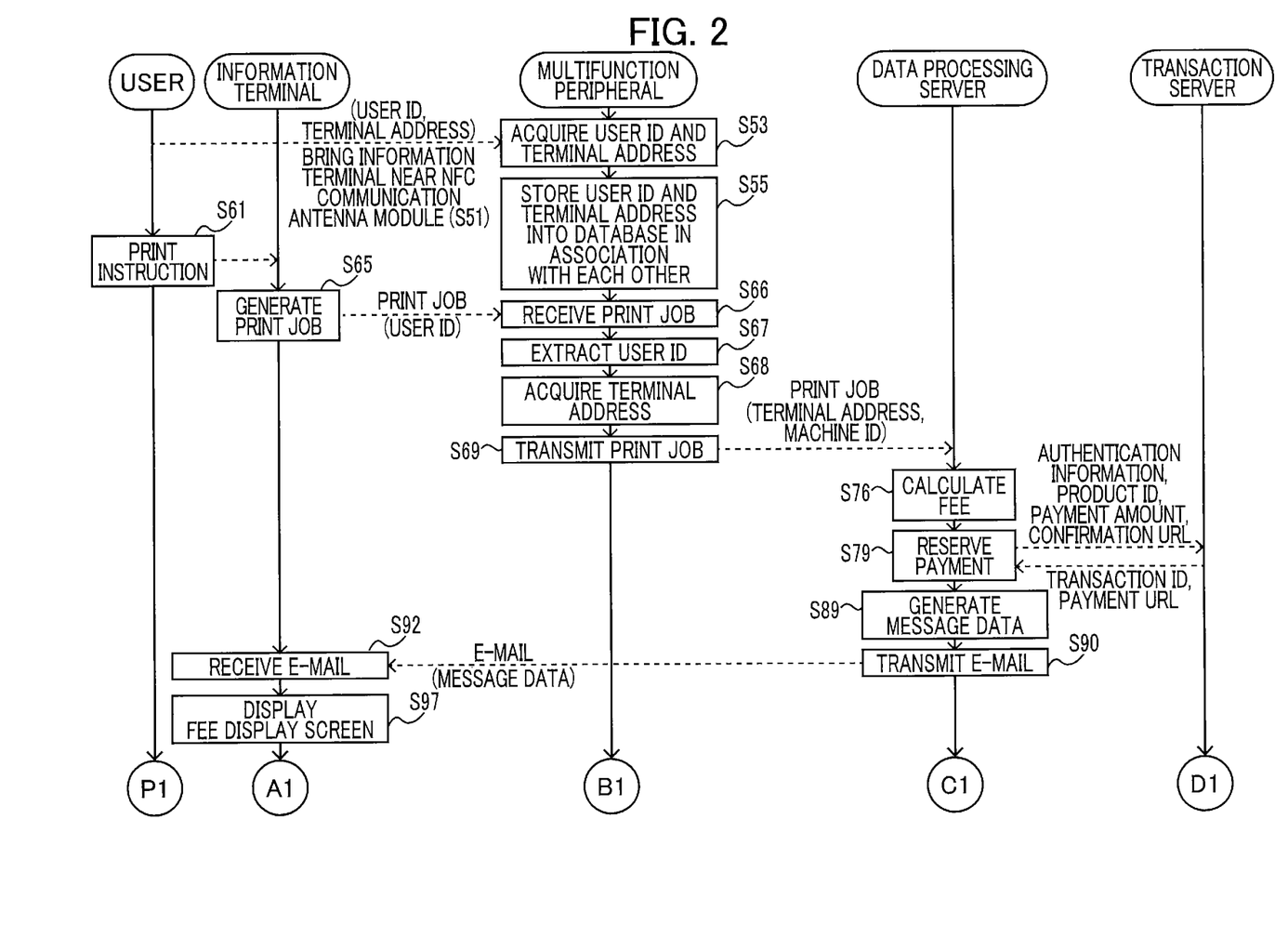
FIG. 2 is a sequence diagram illustrating a first part of a process executed by an information terminal, a multifunction peripheral, a data processing server, and a transaction server.

In the process of FIG. 2, the user first performs a registration process to register an e-mail address of the user on the information terminal 300 into the multifunction peripheral 200 prior to issuing a print instruction (described later). To do this, the user installs a registration application (not illustrated) on the information terminal 300 in advance and performs the registration process using the registration application, for example. Once the user has started up the registration application and has logged in with a user ID which is used to identify the user, in S51 the user places the information terminal 300 near the NFC communication antenna module 260 of the multifunction peripheral 200 or touches the information terminal 300 to the NFC communication antenna module 260. For convenience, phrases such as "brings (places) near or touches to" will be simplified to just "brings (places) near" or the like in the following description.

As a result, the information terminal 300 transmits the user ID and the e-mail address of the user on the information terminal 300 through NFC communication to the multifunction peripheral 200, and the multifunction peripheral 200 acquires the transmitted user ID and e-mail address of the information terminal 300 in S53. Hereinafter, the e-mail address of the user on the information terminal 300 will simply be referred to as "e-mail address of the information terminal 300" or "terminal address" where appropriate. The user ID in this example is an example of the identification information. Note that other identification information, such as a terminal ID or a unique number provided for the information terminal 300, may be used in place of the identification information. The process in S53 is an example of the (d) acquiring.

Next, in S55 the multifunction peripheral 200 stores and registers the terminal address and the user ID acquired in S53 in the database 132 in association with each other. The multifunction peripheral 200 may store and register the terminal address and the user ID acquired in S53 in the non-volatile storage device 230 in place of the database 132.

Figure 3:
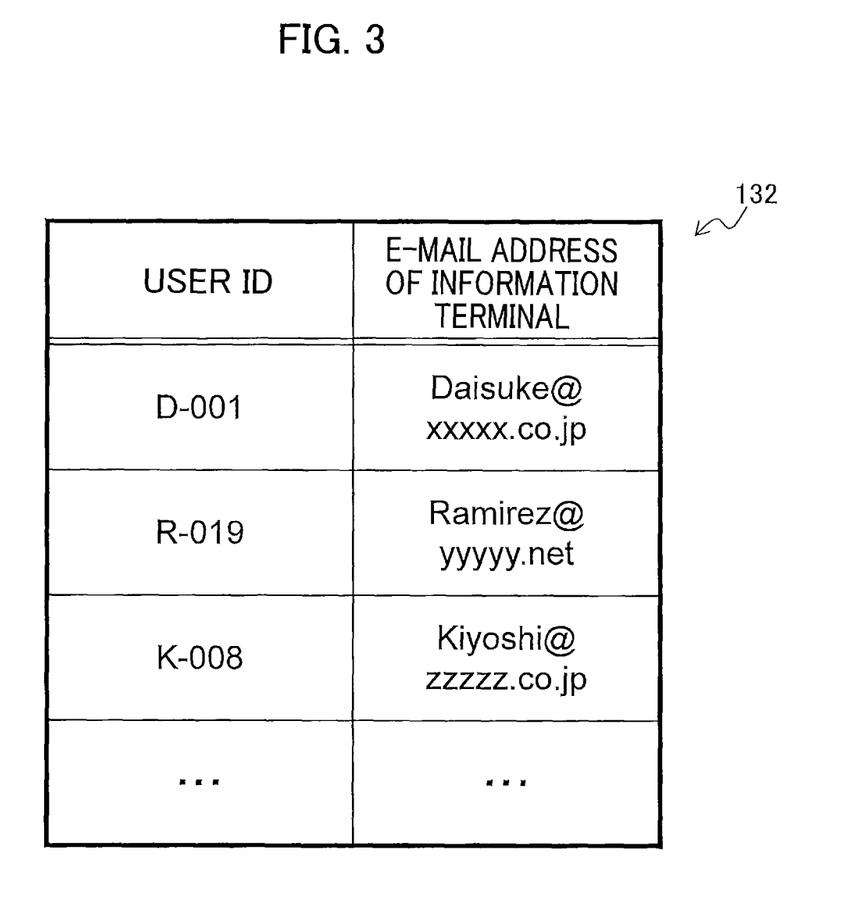
FIG. 3 is an explanatory view illustrating a database in which a user ID and an e-mail address of the information terminal is stored in association with each other.

FIG. 3 illustrates an example of the database 132 or the non-volatile storage device 230. In this example, the user ID "D-001" and the terminal address "Daisuke@xxxxx.co.jp" are registered in association with each other, the user ID "R-019" and the terminal address "Ramirez@yyyyy.net" are registered in association with each other, and the user ID "K-008" and the terminal address "Kiyoshi@zzzzz.co.jp" are registered in association with each other. The process in S55 is an example of the (a) storing.

Thereafter, in S61 the user issues a print instruction for instructing to print an image based on image data prepared by the user through suitable user operations on the information terminal 300. Upon receiving the print instruction, in S65 the information terminal 300 uses a universal printing function of the OS to generate a print job that includes the above image data and transmits the generated print job to the multifunction peripheral 200. The print job transmitted in S65 also includes the user ID. However, rather than including the user ID in the print job, the information terminal 300 may transmit the user ID in a suitable format that associates the user ID with the print job.

In S66 the multifunction peripheral 200 receives the print job transmitted from the information terminal 300.

In S67 the multifunction peripheral 200 acquires the user ID by extracting the user ID from the print job. In S68 the multifunction peripheral 200 references the database 132 (or the non-volatile storage device 230) to identify the terminal address associated with the user ID acquired in S67, and acquires the identified terminal address stored in association with the user ID from the database 132 (or the non-volatile storage device 230). The process in S68 is an example of the (b) acquiring.

In S69 the multifunction peripheral 200 transmits the print job to the data processing server 100 in a form that includes the terminal address, and a machine ID used to identify the multifunction peripheral 200. The process in S69 is an example of the (c) transmitting.

Upon receiving the print job transmitted in S69, the data processing server 100 stores the image data, the terminal address, and the machine ID in the corresponding image data storage area 125, information terminal e-mail address storage area 127, and machine ID storage area 122. Subsequently, on the basis of the image data included in the print job, in S76 the data processing server 100 calculates a fee to be charged to the user for printing an image based on the image data to determine the same. In order to calculate the fee, the data processing server 100 uses a prescribed fee table stored in an appropriate storage area of the volatile storage device 120, for example. When performing the calculation, the data processing server 100 may also take into account print settings included in the print job transmitted from the information terminal 300 in S65. The process in S76 is an example of the (c) determining.

In S79 the data processing server 100 performs a payment reservation process to reserve payment. Specifically, the data processing server 100 transmits a product ID issued for executing the printing service to print the image in the print job, the payment amount for the user obtained by the calculation in S76, authentication information to be used for authentication on the transaction server 400, and a confirmation URL for confirming the completion of payment to the transaction server 400. In the present embodiment, the confirmation URL is a URL of the data processing server 100. After transmitting the information described above, the data processing server 100 receives in return a payment URL that the user can access to pay the fee, and a transaction ID related to the payment process of the fee from the transaction server 400. The payment URL is an example of the payment process information.

In S89 the data processing server 100 generates message data for an e-mail message to be transmitted to the information terminal 300 in S90 (described below). The message data includes the payment URL acquired in S79.

In S90 the data processing server 100 generates an e-mail message that contains the message data generated in S89 and transmits the generated e-mail to the e-mail address of the information terminal 300 acquired in S69. The e-mail address of the user on the information terminal 300 is an example of the transmission address and the transmission address information. The process in S90 is an example of the (d) transmitting.

In S92 the information terminal 300 receives the e-mail transmitted from the data processing server 100. When the user opens the e-mail, in S97 the information terminal 300 displays a fee display screen containing the payment URL, the fee calculated in S76, and the like, whereby the user can confirm the amount that the user must pay to use the current printing service.

Figure 4:
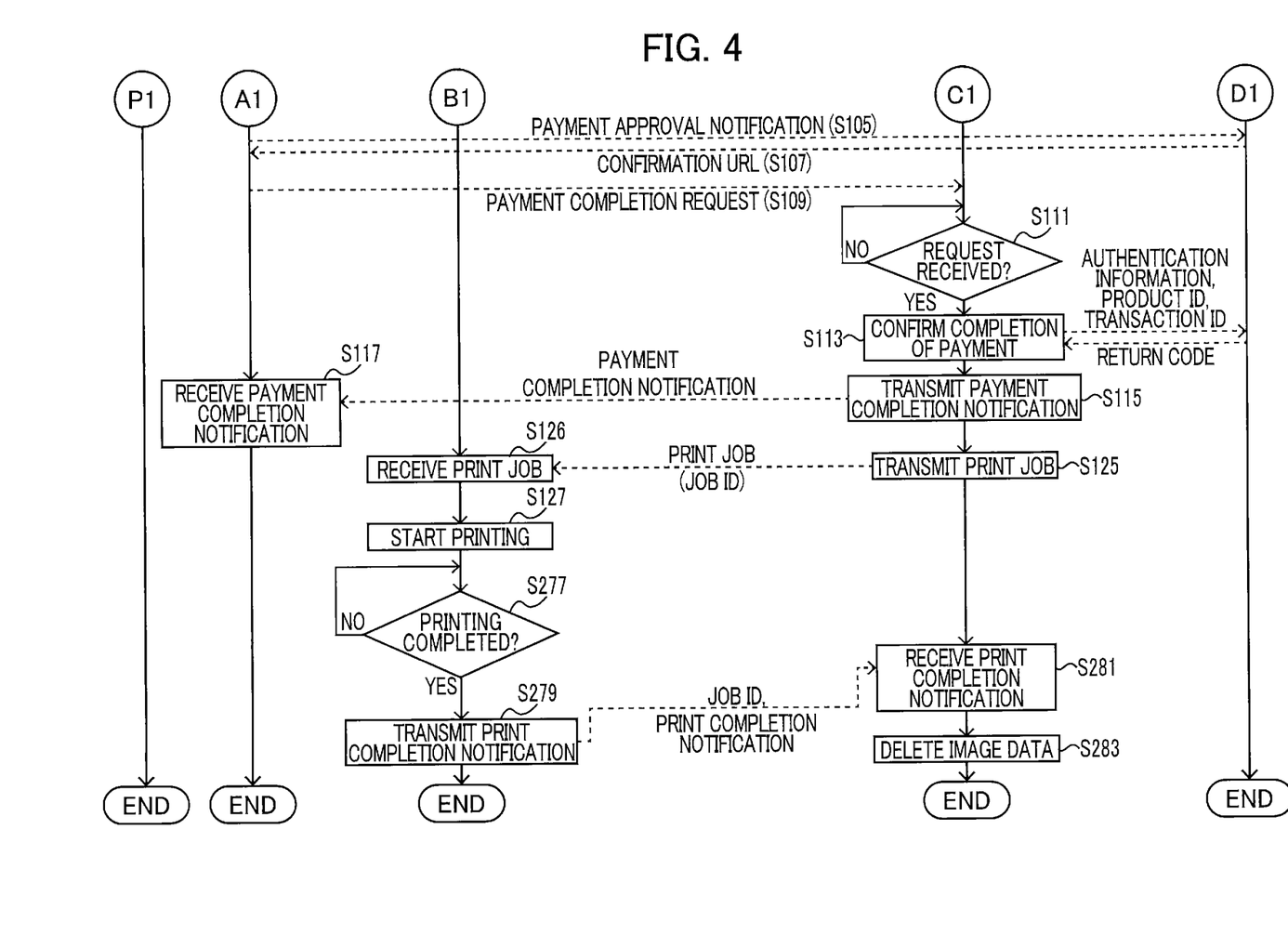
FIG. 4 is a sequence diagram illustrating a second part of the process executed by the information terminal, the multifunction peripheral, the data processing server, and the transaction server.

Referring to FIG. 4, after viewing the fee contained in the fee display screen displayed on the information terminal 300, the user performs appropriate operations on the information terminal 300 to access the displayed payment URL and proceed to a payment process. In S105 of FIG. 4, the information terminal 300 transmits a payment approval notification to the transaction server 400. The payment approval notification indicates that the user has approved of the above payment process, i.e., has agreed to pay the aforementioned fee.

After receiving the payment approval notification, in S107 the transaction server 400 transmits the confirmation URL for payment received in S79 to the information terminal 300. Based on the confirmation URL, in S109 the information terminal 300 transmits a payment completion request to the data processing server 100. At this time, in S111 the data processing server 100 determines whether the payment completion request has been received, and repeats the determination process until the payment completion request has been received (S111: NO). When the data processing server 100 determines in S111 that the payment completion request has been received (S111: YES), in S113 performs a process to confirm completion of payment. Specifically, the data processing server 100 transmits the authentication information, the product ID, and the transaction ID to the transaction server 400 and receives a return code from the transaction server 400 in response.

After performing the process in S113 to confirm the completion of payment, in S115 the data processing server 100 transmits a payment completion notification for the above print job to the information terminal 300 together with a job ID associated with the print job for identifying the same, and the information terminal 300 receives the payment completion notification in S117. Further, in S125 the data processing server 100 transmits the print job received in S69 to the multifunction peripheral 200, and the multifunction peripheral 200 receives the print job in S126. Thereafter, in S127 the multifunction peripheral 200 controls the printing unit 290 to start printing to print the image in the print job received in S126. The process in S127 is an example of the (e) controlling and the (e) performing.

Note that, the multifunction peripheral 200 receives in S126 a print job transmitted from the data processing server 100 in S125 and prints the image in S127 in the present embodiment, but the present disclosure is not limited to this operation. That is, the multifunction peripheral 200 may save the print job received in S66 and may print the image in the saved print job in S127.

While performing the printing, in S277 the multifunction peripheral 200 determines whether the printing the image in the print job has been completed. The multifunction peripheral 200 continues to print the image when the multifunction peripheral 200 determines in S277 that the printing has not yet been completed (S277: NO). When determining in S277 that the printing for the print job has been completed (S277: YES), in S279 the multifunction peripheral 200 transmits a print completion notification to the data processing server 100 together with the job ID. In S281 the data processing server 100 receives the print completion notification and the job ID from the multifunction peripheral 200, and in S283 deletes the image data of the print job corresponding to the received job ID from the image data storage area 125, thereby ending the process.

Advantages of the Embodiment

As described above, when the information terminal 300 in the printing system 1 of the present embodiment transmits a print job to the multifunction peripheral 200, the multifunction peripheral 200 receives the print job and controls the printing unit 290 to print an image based on the print job on papers.

In the meantime, the e-mail address of the user on the information terminal 300 is used as transmission address information in the present embodiment so that the information terminal 300 that has transmitted the print job as described above can perform also a payment process for paying the fee charged for printing. The transmission address information is indicative of a transmission address for transmitting the payment URL to be used for paying the fee. In the present embodiment, identification information for the information terminal 300 (a user ID in the present embodiment) and the transmission address information are stored in the multifunction peripheral 200 in association each other (S55).

In S66 the multifunction peripheral 200 receives a print job together with a user ID, and in S68 acquires the transmission address information stored in association with the user ID in advance. In S69 the multifunction peripheral 200 transmits the acquired transmission address information to the data processing server 100.

Upon receiving the transmission address information, the data processing server 100 uses the received transmission address information to provide a payment URL to the information terminal 300. Accordingly, the user can access the payment URL for paying the fee through an operation on the information terminal 300 in order to proceed to the payment process.

As described above, by providing a payment URL to the information terminal 300 using transmission address information stored in the multifunction peripheral 200 in advance, the user can perform operations on the information terminal 300 to pay the fee in the present embodiment, thereby improving the user-friendliness. Further, the payment URL is provided to the information terminal 300 even when the print job including an image to be printed is generated by the universal printing function of the OS as the printing function of the information terminal 300, for example, thereby improving usability.

One particular feature of the present embodiment is that when the multifunction peripheral 200 receives a print job from the information terminal 300, in S68 the multifunction peripheral 200 reads and acquires transmission address information stored in the database 132 (or the non-volatile storage device 230) in association with the user ID received with the print job and transmits the acquired transmission address information to the data processing server 100 (S69). Thus, in the present embodiment the data processing server 100 can use the transmission address information that has been stored in the database 132 (or the non-volatile storage device 230) in advance to provide a payment URL to the information terminal 300.

Another particular feature of the present embodiment is that the transmission address information is an e-mail address of the information terminal 300. After receiving the e-mail address of the information terminal 300, the data processing server 100 can access and provide a payment URL to the information terminal 300 using the e-mail address (S90). As a result, operations for paying the fee described above can be reliably performed on the information terminal 300 using the payment URL.

Another particular feature of the present embodiment is that the multifunction peripheral 200 includes the NFC communication antenna module 260 for performing a wireless communication. The multifunction peripheral 200 performs a wireless communication with the information terminal 300 via the NFC communication antenna module 260, acquires the e-mail address of the information terminal 300 from the information terminal 300, and stores the acquired e-mail address in the database 132 (or the non-volatile storage device 230). Thus, the multifunction peripheral 200 in the present embodiment can smoothly acquire the user ID and the e-mail address of the information terminal 300 through the wireless communication with the information terminal 300.

Another particular feature of the present embodiment is that NFC communication having a relatively short communication range is performed between the multifunction peripheral 200 and the information terminal 300. That is, when the user places the information terminal 300 near or into contact with the NFC communication antenna module 260, the multifunction peripheral 200 acquires the user ID and the e-mail address of the information terminal 300 those are transmitted from the information terminal 300 via NFC communication. Thus, the multifunction peripheral 200 can acquire the user ID and the e-mail address of the information terminal 300 just by the user placing the information terminal 300 near or touching the information terminal 300 to the NFC communication antenna module 260 of the multifunction peripheral 200, thereby improving convenience for the user.

Variations and Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. Note that, in the modifications described below, parts and components the same as the embodiment described above are designated with the same reference numerals appropriately to avoid the duplicating description.

<(1) Alternative Methods of Acquiring Data>

In the above embodiment, the multifunction peripheral 200 acquires from the information terminal 300 the user ID and the e-mail address of the user on the information terminal 300 in S53 through NFC communication between the multifunction peripheral 200 and the information terminal 300 established by bringing the information terminal 300 near the multifunction peripheral 200, but the present disclosure is not limited to this method. Instead of NFC communication, the multifunction peripheral 200 may acquire the user ID and the e-mail address of the information terminal 300 through another suitable form of a mutual recognition wireless communication that enables mutual recognition between devices, such as Wi-Fi (Japanese registered trademark of Wi-Fi Alliance) and Bluetooth (Japanese registered trademark of Bluetooth SIG. Inc.).

With such technologies, the multifunction peripheral 200 can ensure to obtain the identification information (the user ID in this example) and the e-mail address of the information terminal 300 with high reliability. Additionally, a desktop computer or the like may be used as the information terminal 300 in such cases. Moreover, Bluetooth Low Energy may be used as the communication technology, particularly when communicating across relatively short distances. The process executed by the processor 210 is also an example of the (d) acquiring.

Alternatively, data may be inputted into a web page displayed based on display data in the Embedded Web Server (EWS) file format. In other words, the multifunction peripheral 200 outputs display data in the EWS file format to the information terminal 300, and the information terminal 300 displays an appropriate entry page when the user accesses a web page on the information terminal 300 using a prescribed URL for the above EWS file format. When the user inputs the user ID and the e-mail address for the information terminal 300 into the entry page through suitable operations on the information terminal 300, the multifunction peripheral 200 acquires and stores the user ID and the e-mail address for the information terminal 300 in the database 132 (or the non-volatile storage device 230) in association with each other. Hence, through the above user's input of the user ID and the e-mail address for the information terminal 300 into the web page, the multifunction peripheral 200 can reliably acquire the user ID and the e-mail address of the information terminal 300. The above process executed by the processor 210 is an example of the (e) acquiring.

All of the above cases can obtain the same advantages described in the embodiment.

<(2) Providing a Message Server for Push Notifications>

In this variation, the information terminal 300 first transmits a request to a message delivery server that requests the message delivery server to issue a device token for the information terminal 300. The information terminal 300 transmits the device token and a user ID to the multifunction peripheral 200, and the device token is registered in advance in the database 132 (or the non-volatile storage device 230) in association with the user ID.

Thereafter, when the multifunction peripheral 200 receives a print job including a user ID from the information terminal 300 as described above, the multifunction peripheral 200 reads the device token stored in association with the user ID from the database 132 (or the non-volatile storage device 230) and transmits the device token to the data processing server 100 together with the print job.

After fee calculations and payment reservations for the print job are completed (S76, S79), the data processing server 100 transmits a push notification request to a known address of the message delivery server. The push notification request includes message data including the payment URL, and the device token. The message delivery server identifies the application in the information terminal 300 based on the device token and transmits a push notification that includes the above message data. The device token is also an example of the transmission address information.

Upon receiving the push notification, the information terminal 300 starts up the application program targeted by the notification, whereby a prescribed payment screen is displayed. The payment screen includes the payment URL contained in the message data. The user accesses the payment URL displayed in the payment screen through an appropriate operation to display a fee display screen that includes the calculated fee and the like. In this way, the user can learn the fee that the user must pay to use the current printing service. As a result, in this variation, as in the embodiment described above, operations for paying the fee described above can be reliably performed on the information terminal 300 using the payment URL.

<(3) Issuing a Push Notification from the Data Processing Server 100>

In this variation, an application ID used to identify an application program on the information terminal 300 and terminal identification information used to identify the information terminal 300 are associated with a user ID and registered in the database 132 (or the non-volatile storage device 230) in advance.

When a print job including a user ID is received from the information terminal 300 as described above, the multifunction peripheral 200 reads the application ID and the terminal identification information associated with the user ID from the database 132 (or the non-volatile storage device 230), and transmits the application ID and the terminal identification information to the data processing server 100 together with the print job.

After fee calculations and payment preparations for the print job are completed, the data processing server 100 transmits a push notification to the information terminal 300 identified by the terminal identification information. The push notification includes message data containing the payment URL, and the application ID. The application ID and the terminal identification information are also an example of the transmission address information.

Upon receiving the push notification, the information terminal 300 starts up the application program identified by the application ID, whereby a prescribed payment screen is displayed. The payment screen includes the payment URL contained in the message data. The user accesses the payment URL displayed in the payment screen through an appropriate operation to display a fee display screen that includes the calculated fee and the like. In this way, the user can learn the fee that the user must pay to use the current printing service. As a result, in this variation, as in the embodiment described above, operations for paying the fee described above can be reliably performed on the information terminal 300 using the payment URL.

<(4) Other Modifications>

The information terminal that transmits the user ID and the terminal address, which the multifunction peripheral 200 receives in S53 of FIG. 2, may be different from the information terminal that generates and transmits a print job in S65. For example, if a desktop computer is used as the information terminal for generating and transmitting print jobs in S65, a smartphone may be used as the information terminal that transmits the user ID and terminal address acquired by the multifunction peripheral 200 in S53. Further, rather than transmitting a user ID and a terminal address from an information terminal, the user may directly input the user ID and the terminal address via an operating panel, such as the operating unit 250 of the multifunction peripheral 200.

In the above-described embodiment and modifications, the fee for printing an image is determined by way of calculation, but the other method for determining the fee may be employed. For example, the fee table described above may include ranges for various parameters such as numbers of pages in the print job and coverages and may individually associate a fee amount with each of the ranges. In this case, the fee may be determined by referring to the fee table without any particular calculation.

Using the number of pages to be printed as an example, the table may record XX yen for a range of pages from A pages to B pages, XX yen for a range of pages from B pages to C pages, etc. Thus, once the number of pages in the print job is acquired, the fee can be determined directly by referencing the table without performing the calculation in the above description.

Although the multifunction peripheral 200 executes printing according to the inkjet method in the above description, methods other than the inkjet method may be employed. For example, the multifunction peripheral 200 may employ a laser method for performing printing, and the advantages the same in those in the above description can be obtained. Alternatively, the present disclosure may be applied to a printer employing the method different from the inkjet method or the laser method, such as a thermal-transfer method or the other well-known method.

The sequence diagrams illustrated in FIGS. 2 and 4 in the above description do not limit the present disclosure to the steps indicated therein. Steps may be added or deleted, or the order thereof may be changed where appropriate.

The technique described in the embodiment and modifications described above may be suitably combined to be implemented.

What is claimed is:
1. A printing device comprising:
a controller comprising a processor, the controller being configured to perform:

(a) storing identification information and transmission address information in association with each other;
(b) acquiring, in response to receiving a print job together with the identification information from an external device, the transmission address information stored in association with the identification information in the (a) storing on the basis of the received identification information; and
(c) transmitting the transmission address information acquired in the (b) acquiring to a data processing server so that payment process information is transmitted to a transmission address corresponding to the transmission address information, the payment process information being information to pay a fee charged for performing printing based on the received print job.

2. The printing device according to claim 1, further comprising a storage device,
wherein, in the (a) storing, the controller stores in the storage device the identification information and the transmission address information in association with each other, and
wherein, in the (b) acquiring, the controller acquires from the storage device the transmission address information stored in association with the identification information.

3. The printing device according to claim 1,
wherein the transmission address information is an address information of the external device.

4. The printing device according to claim 1, further comprising a communication interface for performing a wireless communication with the external device,
wherein the controller is configured to further perform:
(d) acquiring, via the wireless communication with the external device through the communication interface, the identification information and the transmission address information from the external device, and
wherein, in the (a) storing, the controller stores the identification information and the transmission address information acquired in the (d) acquiring in association with each other.

5. The printing device according to claim 4,
wherein the (d) acquiring is performed in response to the external device contacting or being brought near the communication interface.

6. The printing device according to claim 4,
wherein the wireless communication is a mutual recognition wireless communication.

7. The printing device according to claim 1,
wherein the controller is configured to further perform:
(e) acquiring the identification information and the transmission address information through user's input of the identification information and the transmission address information into a web page that can be accessed using a prescribed URL, and
wherein, in the (a) storing, the controller stores the identification information and the transmission address information acquired in the (e) acquiring in association with each other.

8. The printing device according to claim 1,
wherein the payment process information includes a URL that can be accessed for payment of the fee.

9. A printing system comprising a printing apparatus and a data processing server,
the printing system being configured to perform:

(a) storing, by the printing apparatus, identification information and transmission address information in association with each other;
(b) acquiring, by the printing apparatus, in response to receiving a print job together with the identification information from an external device, the transmission address information stored in association with the identification information in the (a) storing on the basis of the received identification information;
(c) transmitting the transmission address information acquired in the (b) acquiring to the data processing server,
(d) determining, by the data processing server, a fee to be charged for performing printing based on the received print job;
(e) transmitting, by the data processing server, payment process information to a transmission address corresponding to the transmission address information, the payment process information being information to pay the fee determined in the (e)(d) determining, the payment process information including a URL that can be accessed for payment of the fee; and
(f) controlling the printing apparatus to perform printing based on the received print job after the data processing server receives payment completion information of the payment of the fee.

10. A non-transitory computer-readable storage medium storing a set of program instructions for a printing device comprising a processor,
the set of program instructions, when executed by the processor, causing the printing device to perform:
(a) storing identification information and transmission address information in association with each other;
(b) acquiring, in response to receiving a print job together with the identification information from an external device, the transmission address information stored in association with the identification information in the (a) storing on the basis of the received identification information; and
(c) transmitting the transmission address information acquired in the (b) acquiring to a data processing server so that payment process information is transmitted to a transmission address corresponding to the transmission address information, the payment process information being information to pay a fee charged for performing printing based on the received print job.

11. The non-transitory computer-readable storage medium according to claim 10,
wherein the payment process information includes a URL that can be accessed for payment of the fee.

12. A method for a printing system comprising a printing apparatus and a sata processing server,
the method comprising:
(a) storing, by the printing apparatus, identification information and transmission address information in association with each other;
(b) acquiring, by the printing apparatus, in response to receiving a print job together with the identification information from an external device, the transmission address information stored in association with the identification information in the (a) storing on the basis of the received identification information;
(c) transmitting the transmission address information acquired in the (b) acquiring to a data processing server, (d) determining, by the data processing server, a fee to be charged for performing printing based on the received print job;

(e) transmitting, by the data processing server, payment process information to a transmission address corresponding to the transmission address information, the payment process information being information to pay the fee determined in the (e)(d) determining, the payment process information including a URL that can be accessed for payment of the fee; and (f) performing printing based on the received print job after the data processing server receives payment completion information of the payment of the fee.

* * * * *